F. L. CHURCH.
PROPULSION OF AIRCRAFT.
APPLICATION FILED OCT. 4, 1919.
1,356,429.
Patented Oct. 19, 1920.
8 SHEETS—SHEET 1.
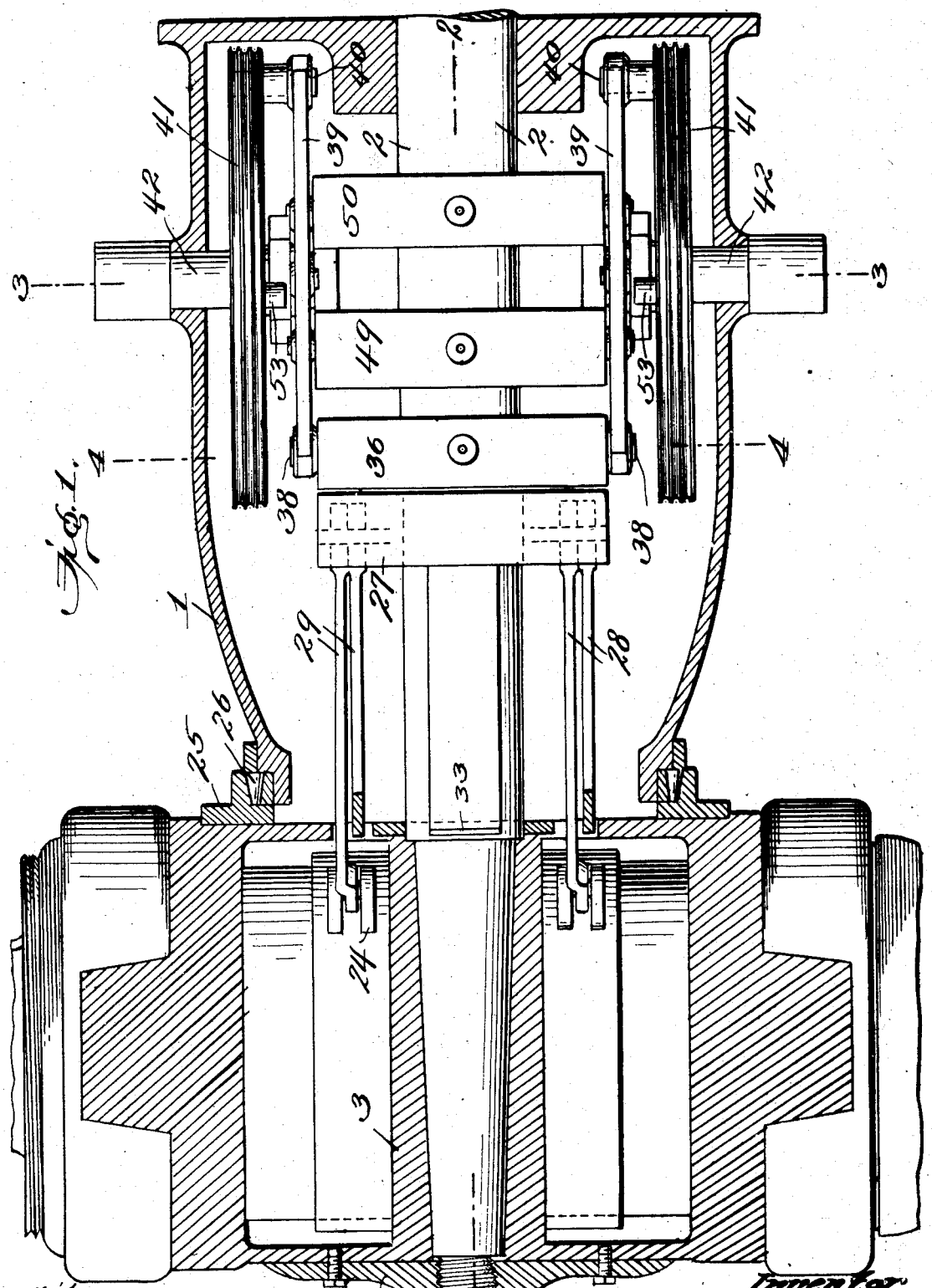

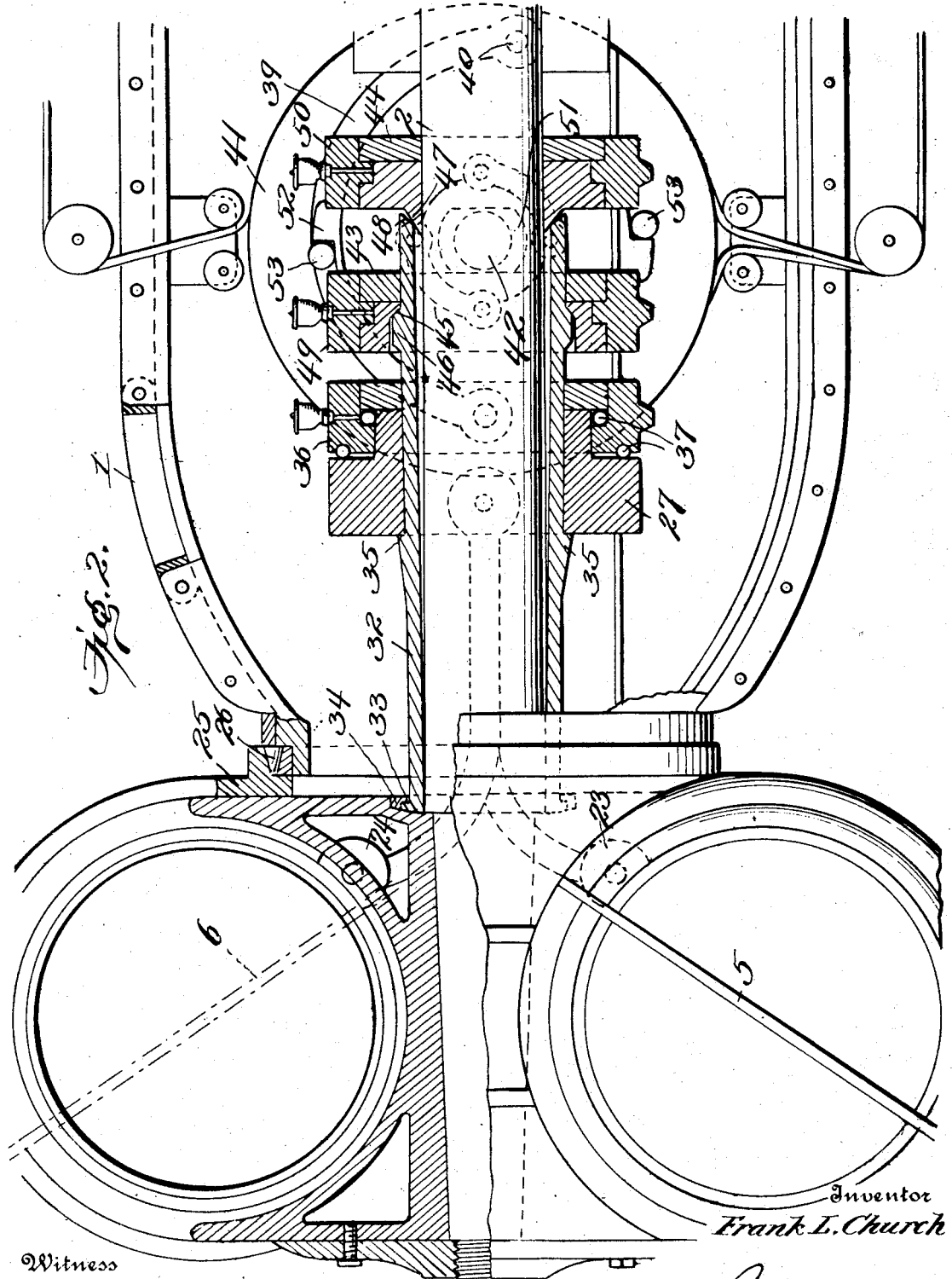

F. L. CHURCH.
PROPULSION OF AIRCRAFT.
APPLICATION FILED OCT. 4, 1919.
1,356,429.   Patented Oct. 19, 1920.
8 SHEETS—SHEET 3.
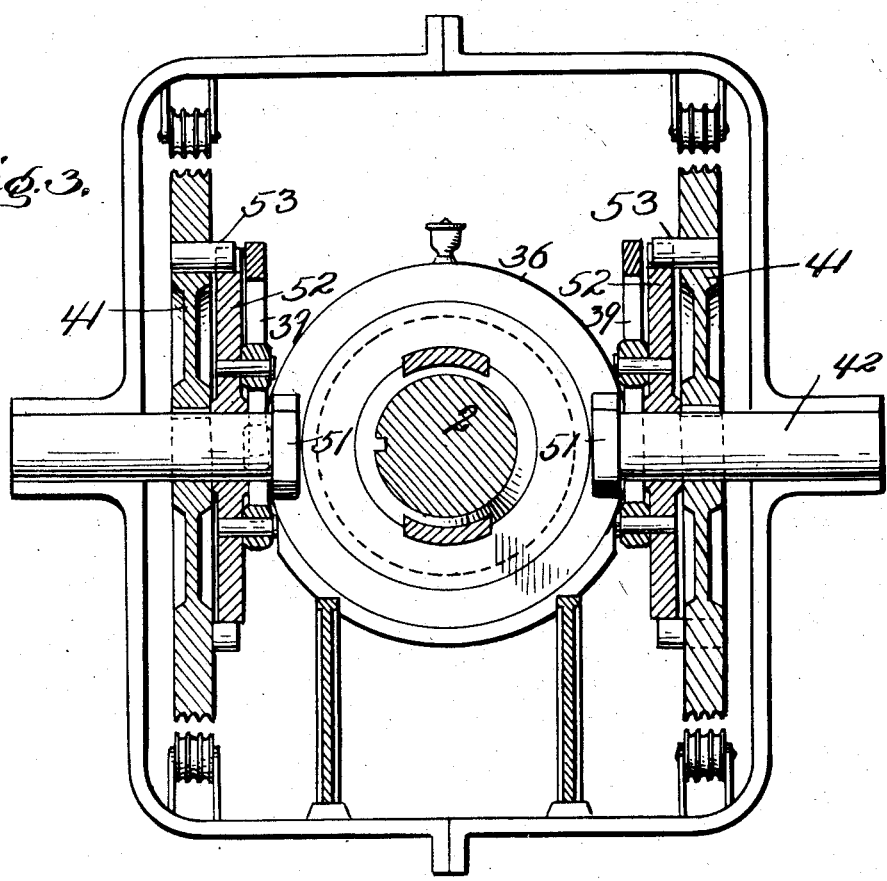
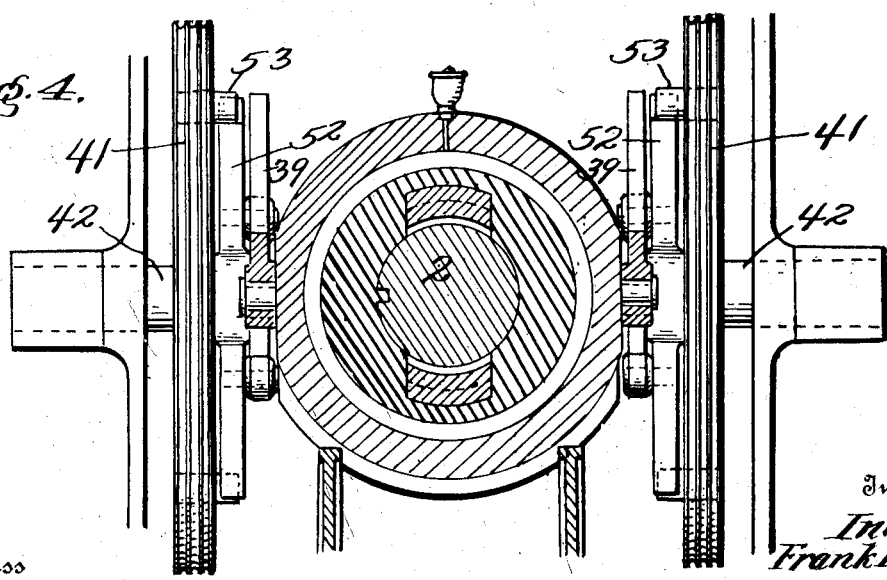
Witness
C. D. Kesler
C. R. Culligan
Inventor
Frank L. Church
By
Attorney F. L. CHURCH.
PROPULSION OF AIRCRAFT.
APPLICATION FILED OCT. 4, 1919.
1,356,429.
Patented Oct. 19, 1920.
8 SHEETS—SHEET 4.
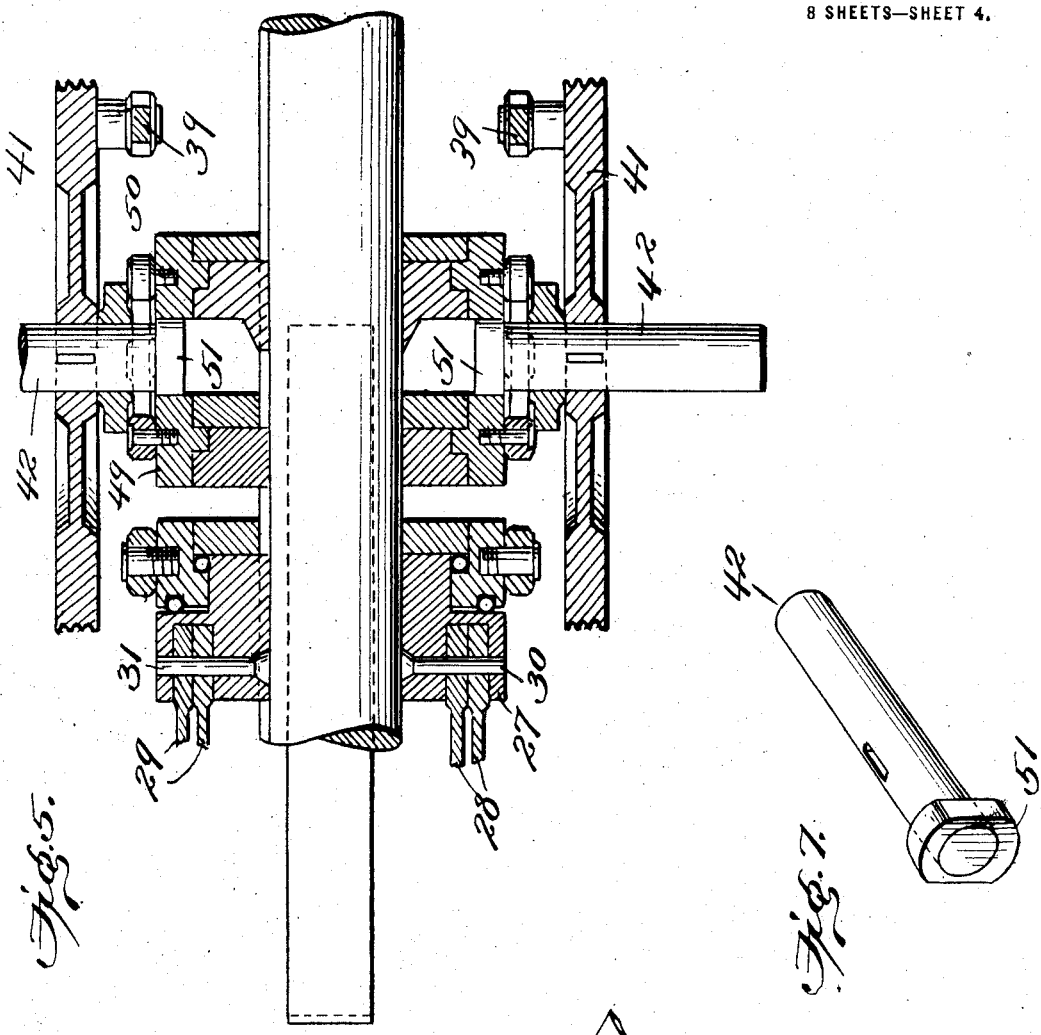
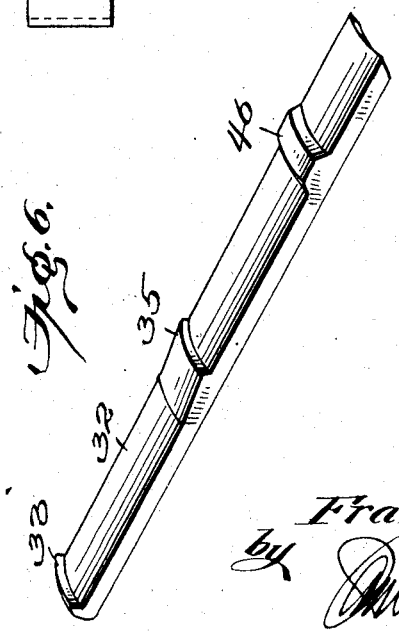
Witnesses:
Inventor
Frank L. Church
by
Attorney

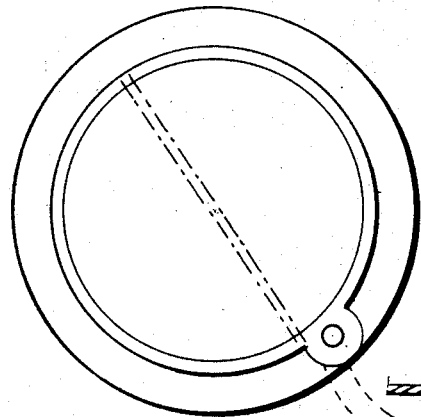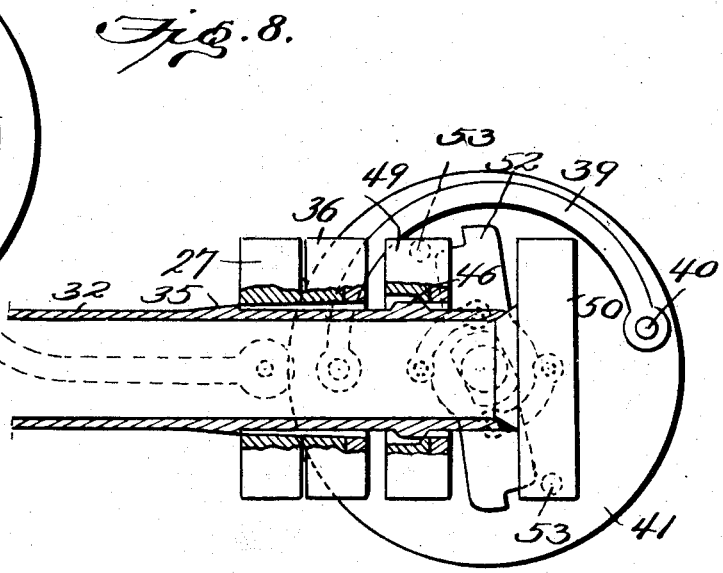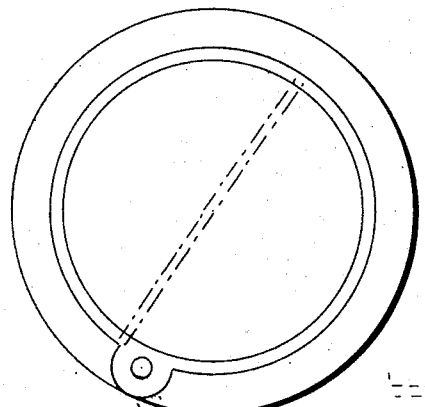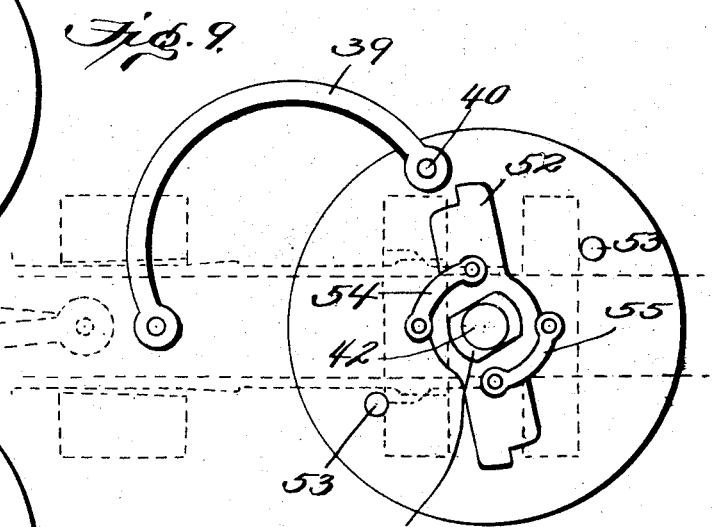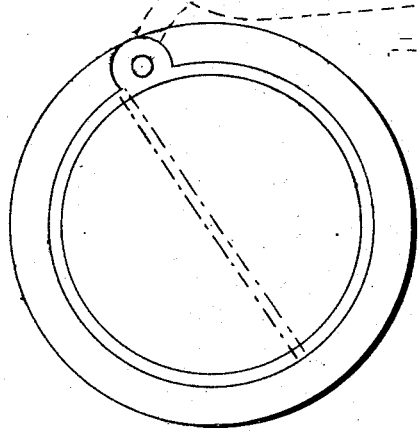

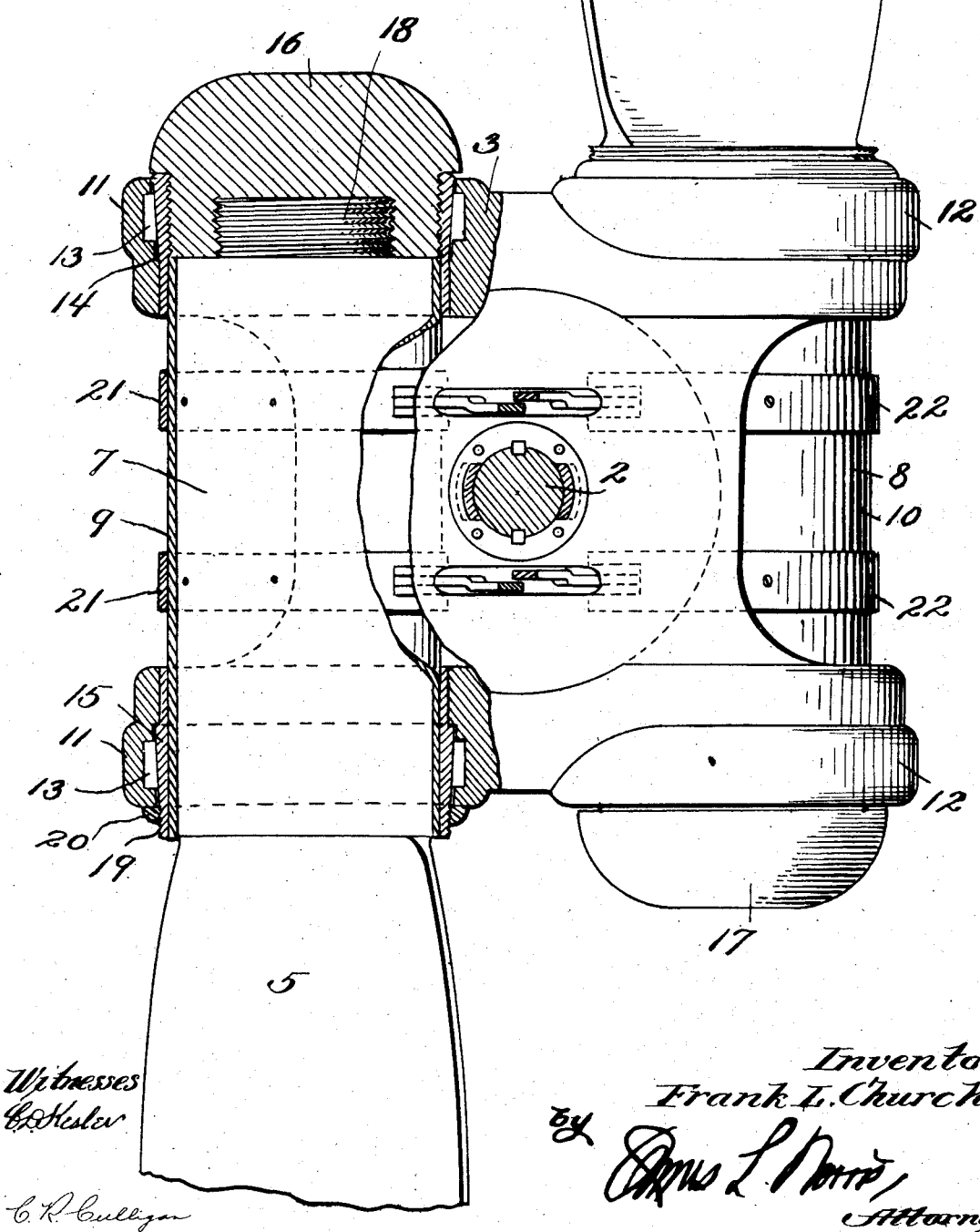

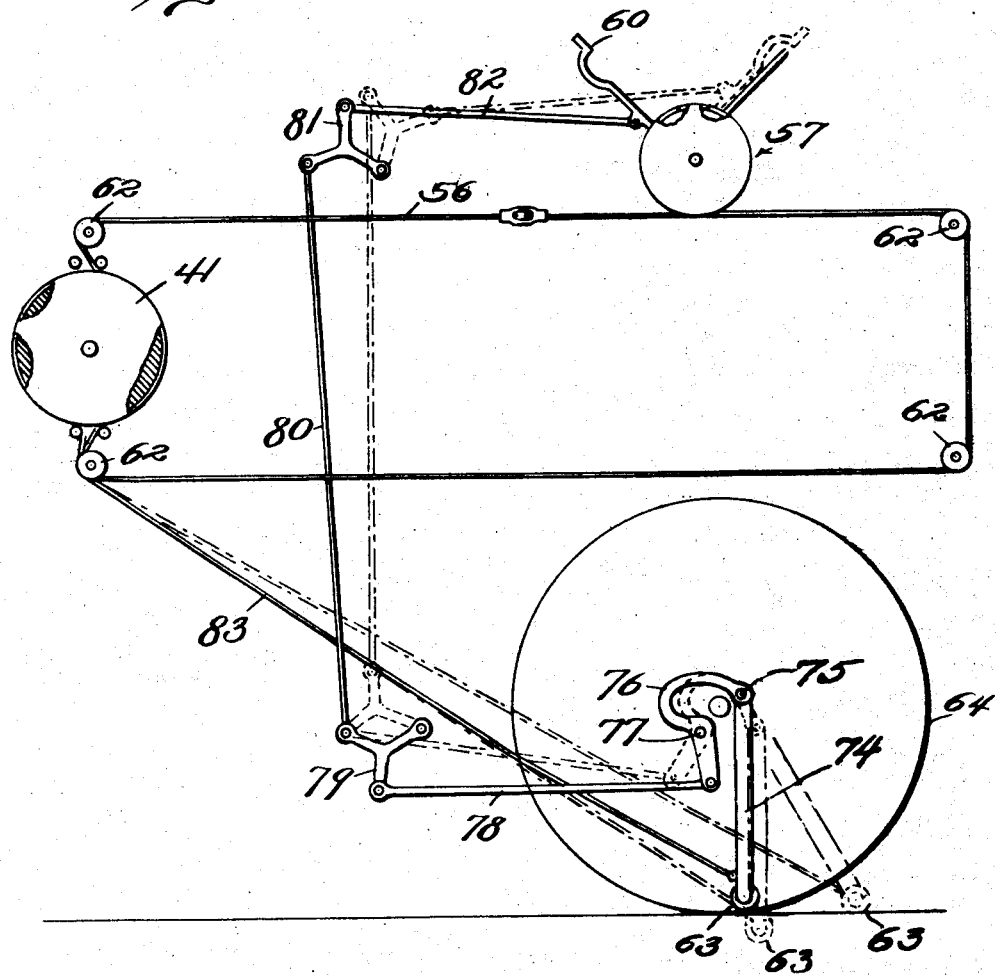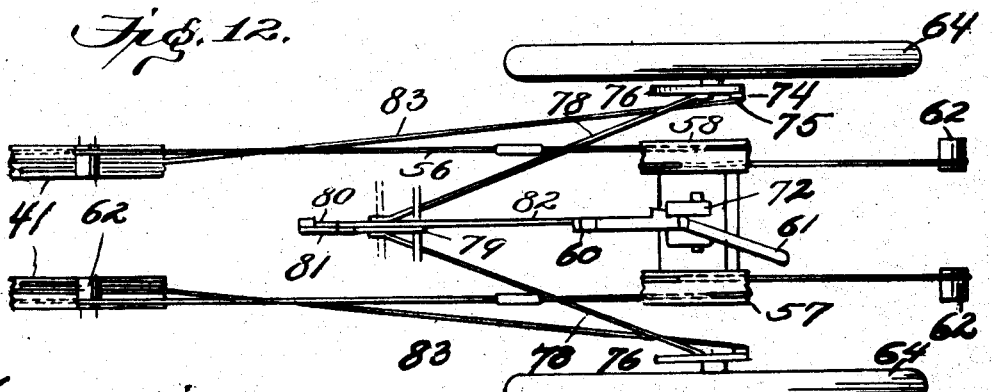

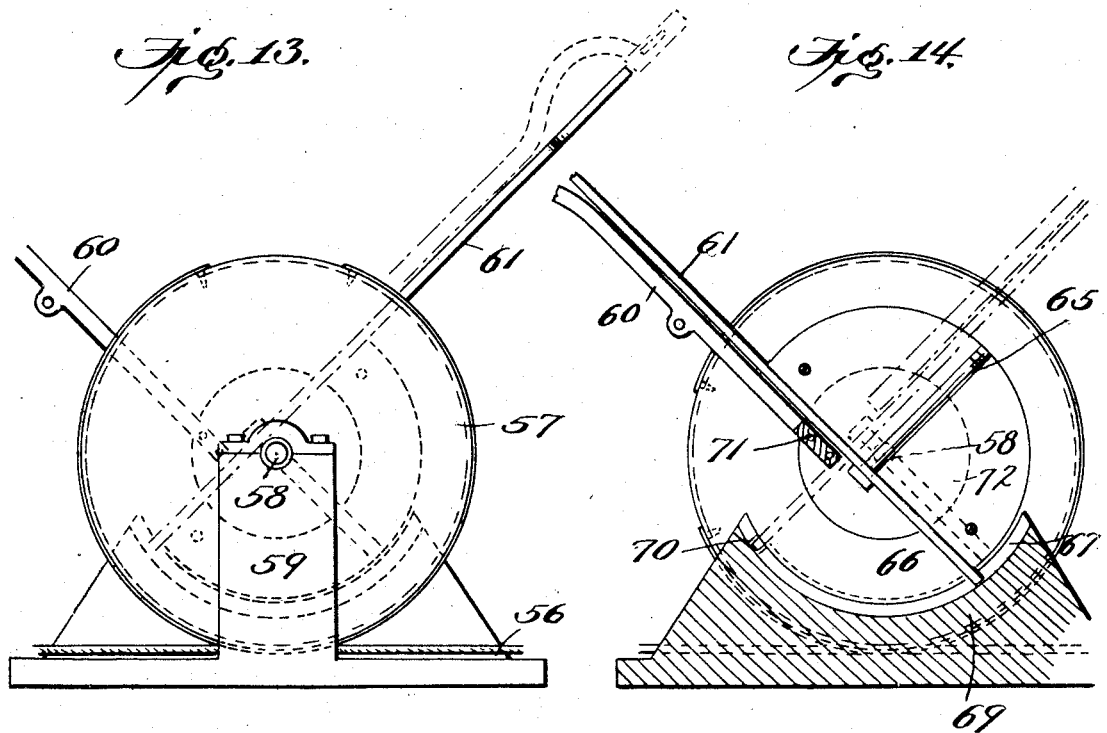
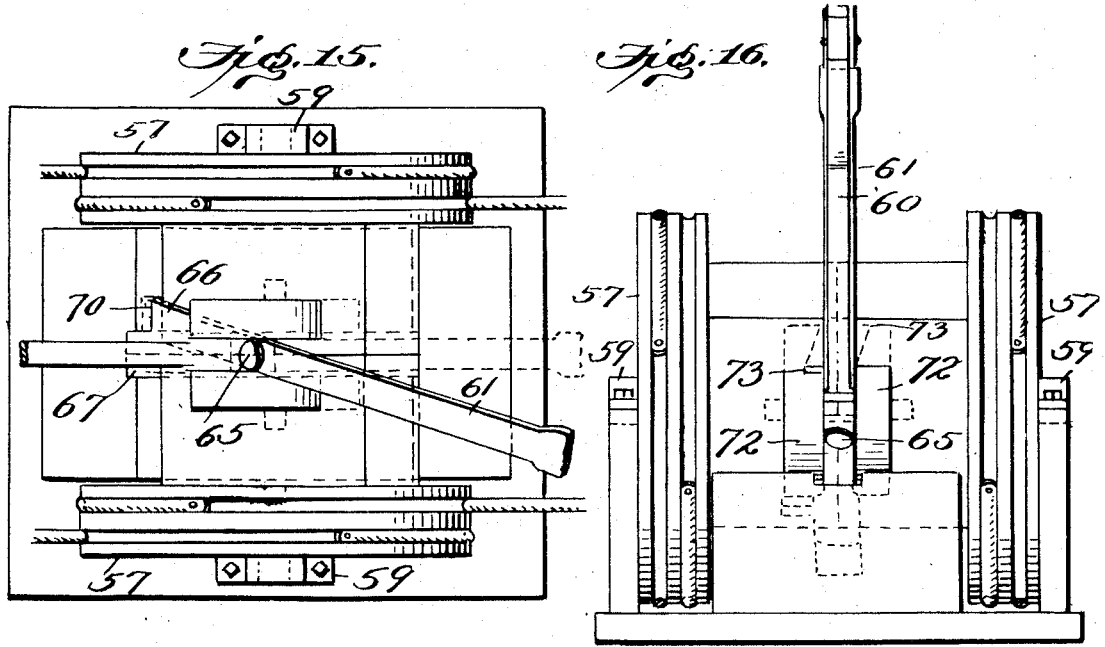

UNITED STATES PATENT OFFICE.

FRANK L. CHURCH, OF COCOANUT GROVE, FLORIDA.

PROPULSION OF AIRCRAFT.

1,356,429.   Specification of Letters Patent.   Patented Oct. 19, 1920.

Application filed October 4, 1919. Serial No. 328,427.

*To all whom it may concern:*

Be it known that I, FRANK L. CHURCH, a citizen of the United States, residing at Cocoanut Grove, in the county of Dade and State of Florida, have invented new and useful Improvements in Propulsion of Aircraft, of which the following is a specification.

My present invention relates to improvements in aircraft of the types which are driven by a propeller or propellers and the primary object of the invention is to provide novel means for reversing the pitch of the propeller for the purpose of maneuvering the aircraft during flight, retarding the forward movement of the aircraft preparatory to or during landing to thus enable the aircraft to land with a relatively short run, and for other purposes. With these and other objects in view, the invention provides novel means by which the direction of pitch of the propeller blades may be set for forward drive or the direction of pitch of the propeller blades may be reversed so that the propeller, while it continues to revolve in the same direction, will exert a retarding influence upon the forward movement of the aircraft. The invention also provides means for controlling the operation of the propeller blade setting means, both manually and automatically, and for locking the propeller blades in their normal or usual position for forward propulsion.

To these and other ends, the invention consists in certain improvements, and combinations and arrangements of parts all as will be hereinafter more fully described, the features of novelty being pointed out particularly in the claims at the end of the specification.

In the accompanying drawings:—

Figure 1 is a top plan view of propeller reversing mechanism constructed in accordance with the present invention parts being shown broken away or in section for illustrative purposes.

Fig. 2 represents a longitudinal section on the line 2—2 of Fig. 1.

Fig. 3 represents a transverse section on the line 3—3, Fig. 1.

Fig. 4 represents a transverse section on the line 4—4 of Fig. 1.

Fig. 5 is a detail sectional view of the propeller blade reversing mechanism.

Fig. 6 is a detail perspective view of one of the locking members for the reversing mechanism.

Fig. 7 is a detail perspective view of one of the cams which control the locking mechanism.

Fig. 8 is a diagrammatic view showing the relative positions of the parts during the initial portion of the operation of reversing the propeller blades.

Fig. 9 is a view similar to Fig. 8 showing the relative positions of the parts when the propeller blades have been reversed.

Fig. 10 is a view partly in section showing the hub in which the propeller blades are reversibly mounted.

Figs. 11 and 12 are diagrammatic views showing the manual and automatic controlling means for setting the propeller blades for forward or reverse action.

Fig. 13 is a side elevation of the double drum and coöperating control levers.

Fig. 14 represents a vertical section through the device shown in Fig. 13, showing the control levers in different positions by the full and dotted lines.

Fig. 15 is a top plan view, and

Fig. 16 is an end elevation of the device shown in Fig. 3.

Similar parts are designated by the same reference characters in the several views.

The present invention is particularly applicable to aeroplanes or machines of the heavier-than-air type, it enabling machines of such type to land with a relatively shorter run than has heretofore been possible. The invention, however, also is applicable to other types of aircraft, such for example, as dirigibles, it enabling aircraft of the latter type to be maneuvered with greater facility than heretofore, owing to the ability of the propeller to act in a direction for either forward or reverse propulsion, although the propeller and hence the engine shaft may revolve always in the same direction. The preferred embodiment of the invention is shown in the accompanying drawings and will be hereinafter described in detail. It is to be understood, however, that the invention is not restricted to the precise construction shown, as equivalent constructions are contemplated and will be included within the scope of the claims.

The apparatus in the present instance comprises a casing 1 which serves to support and to inclose the mechanism of the apparatus. This casing may be fixed to or mounted on any appropriate part of the aircraft, it being preferably bolted or otherwise fixed to the adjacent end of the casing of the engine which serves to drive the propeller. This casing is preferably divided to permit access to its interior, it being shown as composed of flanged halves which may be bolted together. The engine or other driving shaft 2 extends longitudinally through the casing and the reversible propeller is fixed to its end beyond the casing 1. The propeller preferably comprises a hub 3 which may be formed with a tapered bore to fit snugly upon the correspondingly tapered end of the drive shaft, it being secured on the shaft in the present instance by a threaded head 4. The propeller hub is provided with suitable bearings to receive the propeller blades, the propeller blades being rotatable about their longitudinal axes as centers. As shown in Fig. 10, the propeller blades 5 and 6, which are two in number, project from opposite sides of the hub, the longitudinal axes of the blades being located equi-distantly at opposite sides of the driving shaft 2. The inner ends 7 and 8 of the propeller blades are preferably rounded or substantially cylindrical as shown and they may have correspondingly shaped metal sleeves 9 and 10 fitted over them. The propeller hub is formed with pairs of ring like bearings 11 and 12 to rotatably receive the inner ends of the respective blades and in order to enable the propeller blades to rotate within the hub with a minimum amount of friction, anti-friction bearings are preferably provided. For example, the bearings for the blades may be constructed to receive series of anti-friction rollers 13 to coöperate with the outer bearings 11 or 12 and with inner bearing members 14 and 15, the latter bearing members being fitted over the sleeve on the inner end of the propeller blade. The rollers are preferably of the tapered type, their larger ends being directed toward the respective blades, the bearings which coöperate with these rollers being tapered to agree with the taper of the rollers. As shown, the smaller ends of the inner bearing sleeves 14 and 15 are directed toward the respective propeller blades, and hence they are capable of sustaining end thrust due to centrifugal force developed by the rotation of the propeller about its driving shaft as an axis. The effect of this centrifugal force upon the blades is preferably neutralized or reduced by fixing counterweights 16 and 17 to the inner ends of the blades at opposite sides of the center of revolution of the propeller. Each counterweight is preferably threaded upon a reduced part 18 on the inner end of the respective blade and the counterweight may also be threaded into the corresponding inner bearing member 14 as shown in order to maintain this bearing member in its proper longitudinal position on the respective blade and to sustain end thrust on the blade which is developed by rotation of the propeller. Adjustment of the roller bearings may be provided for by threading the inner bearing member 15 as at 19 and applying a threaded locking ring 20 thereon, this locking ring being arranged to abut against the adjacent part of the propeller hub so that by adjusting this ring, the bearing members 14 and 15 which are both fixed on the sleeve 9 may be drawn toward the respective propeller blade, thus taking up both radial and end play in the bearings. The propeller blades are provided with suitable means for rotating them about their longitudinal axes in order to reverse the direction of pitch thereof. Preferably and as shown, pairs of bands 21 and 22 are fixed to the inner ends of the respective blades, these bands having eyes 23 and 24 thereon which are adapted to be connected to the reversing mechanism. Preferably and as shown, a bearing is provided between the propeller hub and the casing 1, this bearing serving to assist the shaft in supporting the propeller. As shown, a bearing ring 25 is fixed to the side of the propeller hub, adjacent to the casing 1. A series of rollers 26 is fitted to operate between this bearing ring and the adjacent end of the casing. Tapered rollers are preferably used, the rollers being so arranged that they will withstand the end-thrust of the propeller as well as to sustain radial forces developed by the propeller due to its rotation.

The reversing mechanism for the propeller blades is housed within the casing 1. This mechanism as shown in the present instance comprises a collar 27 which is fitted to slide longitudinally along the shaft 2, this collar, which is rotatable with the shaft, having pairs of links 28 and 29 pivotally connected thereto by the diametrically opposite pins 30 and 31. One of the links 28 and one of the links 29 are connected to the eyes 23 of the propeller blade 5 while the other pairs of links 28 and 29 are connected to the eyes 24 of the blade 6. Endwise movement of the collar 27 along the shaft acts through the pairs of links 28 and 29 to simultaneously rotate the propeller blades 5 and 6 in reverse directions but through equal angles about their longitudinal axes as centers, the propeller blades being set for forward propulsion when the collar 27 is in its right hand position as shown in Fig. 2 and the blades being set for reverse propulsion when the collar 27 is moved to the left. Means is provided for normally locking or holding the collar 27 in its right hand position so that the propeller blades will be set for forward propulsion. The locking or holding means consists preferably of a pair of locking bars 32 which are arranged at diametrically opposite sides of the shaft 2 and extend longitudinally thereof. The locking bars are provided with means for preventing longitudinal movement thereof with respect to the shaft 2. As shown, these locking bars are provided at the ends thereof adjacent to the propeller with hooks or lugs 33 which are adapted to be confined by a recessed ring or washer 34, the latter being secured to or in the adjacent face of the propeller hub. The locking bars are provided at points intermediate of their length with beveled shoulders 35, these shoulders being so located that when the collar 27 is in its extreme right hand position for setting the propeller blades for forward propulsion, these shoulders will abut against the left hand side of the collar 27 and thus prevent movement toward the left. When the locking bars are thus engaged with the collar 27, the locking bars are spread apart or separated from the shaft as will be understood from Fig. 2. When the locking bars are brought together against opposite sides of the shaft, the shoulders 35 will pass within the hub of the collar 27 and the latter will then be free to shift in a direction to reverse the propeller blades. The means preferably used for actuating the collar 27 to effect shifting of the propeller blades comprises a non-revoluble collar 36 which engages the collar 27 and is adapted to shift longitudinally therewith, although the collar 27 is revoluble while the collar 36 is non-revoluble. If desired, anti-friction bearings 37 may be fitted between the collars 27 and 36 as shown. The non-revoluble collar 36 has pins 38 which project diametrically from its opposite sides and these pins are pivotally connected to links 39, the latter being pivotally connected to crank pins 40 located in corresponding positions on the inner faces of a pair of axially alined wheels 41, the shafts 42 to which the wheels 41 are keyed or otherwise fixed being journaled in opposite sides of the casing 1. The wheels 41 are adapted to rotate in unison through an angle preferably of about 130 degrees, the parts being so proportioned and arranged that when the collar 27 is in its normal and usual position and the propeller blades are set for forward propulsion, the crank pins 40 occupy positions slightly below the center of the shaft 2, these crank pins 40 being then in dead center position with respect to the axes 42 of the wheels 41, and the pivot pins 38 to which the forward ends of the links 39 are connected. It will be understood that the wheels 41 and the links 39 connected thereto are located at opposite sides of the shaft 2.

The means which is preferably used to set the locking bars 32 in locked and unlocked positions comprises preferably a pair of collars 43 and 44 which are revoluble on the shaft 2 and are also shiftable in relative reverse directions longitudinally of the shaft. The collar 43 has a beveled interior bore 45 and the locking bars 32 are formed on their outer sides with lugs 46 which have correspondingly beveled surfaces arranged to be engaged by the interiorly beveled surface of the collar 43. By this arrangement when the collar 43 is shifted toward the left in Fig. 2 its beveled surface will ride upon the beveled surface of the lugs 46 on the locking bars, in consequence of which the locking bars are forced inwardly or against the respective sides of the shaft by which operation the locking shoulders 35 on the locking bars are withdrawn from the path of the collar 27, the latter being then free to shift toward the left in Fig. 2 to perform the operation of reversing the propeller blades. The collar 44 serves to move the bars 32 into locking position for which purpose it is formed with a conical or beveled portion 47 which is arranged close to the shaft 2 and is adapted to enter between the shaft and the adjacent ends of the locking bars when the collar 44 is shifted toward the left in Fig. 2, the locking bars, by such operation, being spread apart, thus moving the locking shoulders 35 into locking relation with the collar 27. To facilitate the operation of the conical or beveled portion 47 of the collar 44, the ends of the locking bars may be beveled as at 48.

In the construction shown, movement of the collars 43 and 44 in a direction away from one another causes the bars 32 to unlock the collar 27 while movement of the collars 43 and 44 toward one another causes the bars 32 to lock the collar 27. The means which is preferably used to effect these movements of the collars 43 and 44 comprises non-revoluble collars 49 and 50 which are fitted over the collars 43 and 44 so that the latter collars may revolve within them, but the non-revoluble collars when shifted lengthwise of the shaft will cause corresponding endwise movements of the respective revoluble collars. The collars 49 and 50 are spread apart or shifted simultaneously in a direction from one another by cams 51 which are fixed on the inner ends of the shafts 42 to which the wheels 41 are fixed, these cams being so spaced that they will spread apart the collars 49 and 50 during the initial part of the rotation of the wheels 41 and the cams will shift the collars 49 and 50 to an extent sufficient to effect unlocking of the collar 27 relatively to the shoulders 35 on the locking bars. Movement of the collars 49 and 50 toward one another to effect locking of the collar 27 by the shoulders 35 on the locking bars is effected by a pair of cross bars 52 which are rotatably mounted on the respective shafts 42 and are notched to receive diametrically opposite pins 53 carried on the inner faces of the respective wheels 41, each cross bar 52 being connected to the collars 49 and 50 by links 54 and 55 respectively. The parts are preferably so proportioned and arranged that the pins 53 on the wheels 41 will come into engagement with the cross bars 52 during the final portion of the return rotation of the wheels 41 which restores the propeller blades for forward propulsion, the cross bars 52 being thereby rotated positively to effect locking of the collar 27, the link 54 of each cross bar 52 drawing the collar 43 to the right in Fig. 2 and thus disengaging its incline 45 from the lugs 46 on the locking bars and the collar 44 being forced by the link 55 of each cross bar toward the left in Fig. 2 thereby pushing the conical or wedge-shaped portion 47 on this collar between the adjacent ends of the locking bars and the respective sides of the shaft, the locking bars 32 being thus swung outwardly about their hook-shaped ends 33 as centers, bringing the locking shoulders 35 into the path of movement of the collar 27. The collar 27, which is connected to the reversible propeller blades through the pairs of links 28 and 29 as previously described, is then locked for movement, in consequence of which the propeller blades are held in position for forward propulsion. The locking and unlocking of the collar 27 and also the shifting movements of the collar 27 to set the propeller blades for forward or reverse propulsion are effected by rotation of the wheels 41 in unison, the initial part of the rotation of these wheels from normal position performing the unlocking operation while the continued rotation of these wheels in the same direction affects the shifting movement of the collar 27 to reverse the propeller blades. Reverse rotation of the wheels 41 to restore the propeller blades for forward propulsion acts initially to rotate the blades into the proper position and the final portion of the rotation of the wheels 41 effects locking of the collar 27 so that it will hold the propeller blades in position for forward propulsion. This cycle of operations is obtained, in the present instance, by so proportioning the parts that the crank pins 40 on the wheels 41 will rest somewhat below the center of the shaft 2 when the collar 27 is locked in position to hold the propeller blades in their set positions for forward propulsion, the parts being shown in this position in Fig. 2. When the wheels 41 are rotated in an anti-clockwise direction (Fig. 2) through an arc of about 130 degrees, the preliminary part of such rotation will carry the crank pins 40 across the dead center of the shafts 42 and the pins 38 and hence during this movement there will be no appreciable longitudinal movement of the propeller shifting collar 27. However, during this preliminary or initial movement of the wheels 41, the cams 51 which turn with the shafts 42 which are fixed to the wheels 41 will rotate sufficiently to spread apart the collars 43 and 44, the collar 43 moving to the left in Fig. 2 and acting on the lugs 46 to force the locking bars 32 together or toward the respective sides of the shaft while the collar 44 is shifted toward the right in Fig. 2, withdrawing the expanding cone or wedge 47 so as to permit the locking bars to be forced together by the collar 43. Also during this initial or preliminary rotation of the wheels 41, the pins 53, which are arranged in pairs on the inner sides of the wheels 41 recede from the notched ends of the respective cross bars 52 thus permitting these cross bars, which are rotatable loosely on the respective shafts 42 to swing in an anti-clockwise direction under the influence of the links 54 and 55 which connect each cross bar with the collars 43 and 44, thus avoiding any obstruction to the relative separating movement of these collars in a direction to unlock the mechanism. Fig. 8 shows the relative position of the parts the moment the propeller shifting collar 27 has been unlocked. Continued rotation of the wheels 41 in the same direction carries the crank pins 40 through an arc of sufficient angle to reverse the propeller blades. Owing to the connection provided between these crank pins 40 and the propeller shifting collar 27 through the instrumentality of the links 39 and the non-revoluble collar 36, the collar 27 will be shifted to the left (Fig. 2) to an extent sufficient to effect reversal of the directions of pitch of the propeller blades, the collar 27 acting to reverse the propeller blades through the medium of the links 28 and 29 as previously described. Fig. 9 shows the parts in the positions which they occupy when the propeller blades are set for reverse propulsion. During the latter part of the rotation of the wheels 41 which accomplish reversal of the propeller blades, the cams 51 rotate in unison with the wheels 41, but the portions of these cams which act on the collars 49 and 50 are concentric and hence the collars 43 and 44 which control the locking bars will remain stationary or substantially so. The propeller blades are returned to their normal or usual positions for forward propulsion by clockwise rotation of the wheels 41 (Figs. 2, 8 and 9), the crank pins 40 finally coming to rest in the position shown in Fig. 2. The first part of the rotation of the wheels 41 in the direction stated causes the links 39 to draw the collar 27 to the right and when the wheels 41 have been rotated in said direction to the extent shown in Fig. 8, the collar 27 will occupy such a position that the propeller blades will be set for forward propulsion and also this collar will be in a position that will permit the locking shoulders 35 to move outwardly and to lock said collar. The final part of the rotation of the wheels 41 carries the crank pins 40 from the position shown in Fig. 8 into the position shown in Fig. 2 and during this final movement of the wheels 41, the low or flat portions of the cams 51 assume positions between the collars 49 and 50 so that said collars are free to move toward one another. Furthermore, the final part of the return rotation of the wheels 41 brings the pins 53 on said wheels up against the ends of the respective cross bars 52 causing these cross bars to rotate in unison with the wheels 41 and such rotation of the cross bars 52 causes the links 54 and 55, which connect the cross bars to the collars 49 and 50, to directly force the collars 43 and 44 toward one another, the collar 43 being caused to recede from the beveled or cam shaped lugs 46 on the locking bars and the conical portion of wedge 47 on the collar 44 being simultaneously forced into position to spread apart the locking bars, thus moving the shoulders 35 thereon into locking engagement with the collar 27.

Different controlling means may be provided to act upon the wheels 41 to rotate these wheels in the proper direction to set the propeller blades for forward or reverse propulsion. It is preferable to provide control means which may be operated manually or at the will of the pilot, and which may also be set so that it will operate automatically at the beginning of the landing of the aircraft, an automatic control being particularly advantageous when the apparatus is applied to an aeroplane. In the present instance a dual control is shown in Figs. 11 and 12, this control embodying a pair of cables 56 which pass around the wheels 41, the latter being preferably grooved on their peripheries to guide the cables, and the cables are connected to a revoluble double drum 57 which is also preferably grooved peripherally to guide the cables, this double drum being rotatably mounted by a shaft 58 and bracket 59 in a position where the control levers 60 and 61 may be conveniently reached and manipulated by the pilot. A suitable number and arrangement of idler pulleys 62 may be placed on the structure of the aircraft in order to guide the cables. The automatic action of the cables to reverse the propeller blades upon landing comprises preferably auxiliary ground wheels 63 arranged adjacent to the usual landing wheels 64, these auxiliary wheels, when they engage the ground or other surface upon which a landing is made, being shifted or deflected and the movement thus imparted to the auxiliary wheels 63 is utilized to actuate the mechanism automatically to reverse the propellers and to set them for reverse propulsion.

The construction of the double drum and the operative relation of the control levers therewith are shown in Figs. 13 to 16, inclusive. The manual operating lever 61 is pivoted on a pin 65 which is secured to the double drum, the lever 61 having a portion 66 which projects into a groove 67 which is concentric with the shaft or axis 58 of the drum and is formed in the base 69 of the bracket 59. This groove 67 is formed near one end with a lateral offset or notch 70 which is adapted to receive the portion 66 of the lever 61 when the latter is swung laterally about the pin 65 as an axis. While the lever 61 occupies an upright position, or a position perpendicular to the shaft 58, the lower end of the portion 66 of this lever will operate in the concentric groove 67 without obstruction and the lever 61 may therefore be swung through an appropriate arc, and by reason of its connection with the double drum through the medium of the pin 65 the lever 61 will rotate the double drum through a corresponding arc. The lever 61 constitutes manual means for reversing the propeller blades, the rotation imparted to the double drum 57 through the operation of this lever being transmitted by the cables 56 to the wheels 41, the latter being thus rotated to first unlock the propeller blades and subsequently to reverse the propeller blades in a manner hereinbefore described. When, however, the lever 61 occupies the full-line position shown in Fig. 15 with the lower end of its portion 66 engaged in the notch 70, the double drums are locked from rotation, the propeller blades being then maintained in position for forward propulsion. The lever 60 serves to unlock the lever 61 from its notch 70 preparatory to the reversing of the propeller blades by the automatic reversing mechanism which is associated with the landing wheels or gear. Preferably, and as shown, this lever 60 is fixed at 71 between a pair of disks 72, the latter being rotatably mounted concentrically within the double drum. The inner faces of the disks 72 are formed with recesses 73 which permit the lever 61 which occupies a position between the disks to swing laterally or into the locking position shown in Fig. 15, the walls of these recesses being beveled or inclined, as shown in Fig. 16. In consequence, when the lever 60 is moved from the dotted-line position into the full-line position in Fig. 13, the beveled or inclined walls of the recesses 73 will act through the rotation of the disks 72 upon the opposite edges of the lever 61, thereby causing the lower extremity of the portion 66 of the lever 61 to be moved out of the locking notch 70 into the groove 67, the double drum being then in unlocked condition and in readiness to rotate through the action of the automatic propeller reversing mechanism. The shifting of the lever 60 not only unlocks lever 61 in the operation of shifting, but it also drops the auxiliary wheels, or triggers 63 from a position above to a position somewhat below the horizontal plane of the ground-contacting portion of the landing wheels, in which location the auxiliary wheels or triggers 63 are the first to come into contact with the ground or any other obstacle when landing, these auxiliary wheels or triggers 63 being journaled on the lower ends of links 74, the upper ends of which are pivotally connected at 75 to levers 76, these levers 76 in turn being pivoted at 77 to a relatively fixed part of the frame of the landing gear forming a part of the operating connection as shown in Fig. 11, the connections including links or bars 78, a bell crank 79, a bar 80, a bell crank 81 and a bar 82 connected to the lever 60. The shifting of lever 60 is the means of placing the mechanism in such a position that automatic action could take the place of manual action at the time of landing, if desired, it being optional on the part of the pilot as to whether or not the device shall become automatically operative at the time of landing. It is obvious that the running or sliding motion of contact would give a backward thrust to link 74 as the auxiliary wheels or triggers 63 touch the ground or other obstruction, which in turn would pull cables 83 suitably connected with wheels 41, upsetting the device and starting the reverse motion of the propellers in much the same manner as through the medium of the manually operated connections.

By this construction, a dual control is provided. The propeller blades can be reversed manually by swinging the lever 61 manually while the lower end of the portion 66 of this lever is in line with the groove 67. When the lever 61 is rocked laterally so as to engage the lower end of the portion 66 in the notch 70, the propeller reversing mechanism is locked against manual control. When the lever 60 is shifted from the dotted-line position, Fig. 11, to the full-line position in that figure, due to the engagement of the auxiliary wheels 63 with the ground or surface upon which the landing is made, the lever 61 is set in unlocked condition by the action of the inclined walls of the recesses 73 acting on the sides of the lever 61 during the consequent rotation of the disks 72, and the rearward deflection of the auxiliary wheels 63 due to the engagement of these wheels with the ground operates through the cables 83 to rotate the wheels 41 to first unlock the propeller blades and then to reverse the propeller blades.

I claim as my invention:—

1. Propelling means for aircraft comprising a propeller having reversible blades capable of being set for either forward or reverse propulsion of the aircraft while the propeller revolves in one direction, and means operative automatically during landing of the aircraft for setting the propeller blades for reverse propulsion while the propeller is revolving.

2. Propelling means for aircraft comprising a revoluble bladed propeller the direction of pitch of whose blades is reversible for either forward or reverse propulsion of the aircraft, manually controlled means capable of setting the blades for either forward or reverse propulsion while the propeller is revolving, and means controlled automatically during landing of the aircraft for setting the blades for reverse propulsion.

3. Propelling means for aircraft comprising a revoluble propeller having reversible blades for forward or reverse propulsion, means operative manually, and also automatically during landing of the aircraft, to set said blades for either forward or reverse propulsion while the propeller revolves in the same direction, and locking means for the propeller blades releasable during the initial part of the operation of said blade-setting means.

4. Propelling means for aircraft comprising a revoluble propeller having reversible blades for forward or reverse propulsion, and means operative automatically upon engagement with the surface upon which the aircraft lands to reverse the propeller blades.

5. Propelling means for aircraft comprising a revoluble propeller having blades whose direction of pitch is reversible, means for normally locking the propeller blades in position for forward propulsion and capable of operating to reverse the direction of pitch of the blades, and means controlled by the landing of the aircraft for automatically unlocking the propeller blades and subsequently reversing their direction of pitch.

6. The combination of a revoluble propeller having blades whose direction of pitch is reversible for forward or reverse propulsion, and means for normally locking the blades in position for forward propulsion, said means including a member which when moved in one direction acts first to unlock the blades and operates subsequently by further movement in the same direction to reverse the direction of pitch of the propeller blades.

7. The combination of a revoluble propeller whose direction of pitch may be set for either forward or reverse propulsion, a member operative to set said blades, means for locking said member in position to retain the blades set for forward propulsion, and operating means active, when moved in one direction, to first unlock said member and to subsequently shift said member to reverse the propeller blades.

8. The combination of a revoluble propeller having blades the direction of pitch of which may be set for either forward or reverse propulsion, a reciprocable member operative to set the propeller blades for either forward or reverse propulsion, means for locking said member in one of its two positions, and operating means active when moved in one direction to first unlock said member and to subsequently shift said member to alter the direction of pitch of the propeller blades, said operating means acting, when moved in an opposite direction, to first restore the initial direction of pitch of the propeller blades and to subsequently lock said member whereby the propeller blades are held in their initial position.

9. The combination of a revoluble propeller ha.ing blades whose direction of pitch may be set for either forward or reverse propulsion, a collar shiftable axially of the propeller and connected to the blades thereof for setting the propeller blades for forward or reverse propulsion, locking means for holding the collar in a predetermined position, other collars operative respectively to set the locking means in locked and unlocked condition, and operating means operative when moved in one direction first upon the latter collars to unlock the locking means and subsequently upon the first mentioned collar to alter the direction of pitch of the propeller blades.

10. The combination of a revoluble propeller having reversible blades, a member connected to the blades for reversing them, locking means for controlling the reversing of the propeller blades, operating means acting when moved in one direction to first unlock said member and to subsequently shift said member to set the propeller blades in one position and acting when moved in an opposite direction to first shift said member to restore the propeller heads and to subsequently set said locking means in relocking condition, and a device actuated by the final part of such movement of the operating means for directly actuating the locking means to lock said member.

11. The combination of a revoluble propeller having reversible blades and a drive shaft, a collar shiftable axially on said shaft and connected to the propeller blades for setting the pitch of said blades, locking members arranged longitudinally along the shaft to hold said blade-setting collar in a pre-determined position, controlling collars for the locking members also shiftabe axially of the shaft, and a rotatable operating member located at one side of the shaft and having a connection between it and the blade shifting collar for actuating the latter and also having means for actuating the controlling collars for the locking members.

12. The combination of a revoluble propeller having reversible blades and a drive shaft, a collar shiftable axially of the shaft and connected to the propeller blades for setting the pitch thereof, a rotatable operating member located at one side of said shaft, and a connecting rod attached to said collar and having a crank connection with said rotatable member, rotation of said member acting to shift said collar and the connecting rod and its crank connection being arranged to assume a dead-center blade-locking position when the collar occupies a predetermined position.

13. The combination of a revoluble propeller having reversible blades and a drive shaft, a collar shiftable axially on the shaft and connected to the blades for setting the pitch thereof, locking bars arranged longitudinally of the shaft and movable toward and from the shaft to control the shifting movement of said collar, and operating means movable in one direction to set the locking bars in non-locking relation to the collar and to subsequently shift the collar.

14. The combination of a revoluble propeller having reversible blades and a drive shaft, means connected to the blades for setting the direction of pitch thereof, locking members coöperative with said blade-setting means for controlling the operation thereof, opposed collars movable in opposite directions axially of the shaft, one of said collars operating to set the locking members in non-locking condition and the other collar operating to set the locking members in locking condition, an operating element at one side of the shaft and having a part movable therewith and acting on said collars to relatively separate them and thus unlock the locking members, and a member operative by a reverse movement of the operating element and acting on said collars to relatively draw them together and thus move the locking members into locking position.

15. Propelling means for aircraft comprising a revoluble propeller having reversible blades for forward or reverse propulsion, means operative manually to set said blades for either forward or reverse propulsion, and means releasable automatically by a part of the operating movement of said blade-setting means for locking the said manually operative means in predetermined position.

16. Propelling means for aircraft comprising a revoluble propeller, having reversible blades for forward or reverse propulsion, manually operative means to set said blades for either forward or reverse propulsion, means for locking said manually operative means to maintain the propeller blades in position for forward propulsion, and means operative automatically upon engagement with the surface upon which the aircraft lands to first unlock the manually operative means and to subsequently reverse the propeller blades.

In testimony whereof I have hereunto set my hand in presence of two subscribing witnesses.

FRANK L. CHURCH.

Witnesses:
R. L. STEWART,
B. E. STEWART.